(12) United States Patent
An et al.

(10) Patent No.: US 11,693,101 B1
(45) Date of Patent: Jul. 4, 2023

(54) TECHNIQUES FOR TARGET ORIENTATION ESTIMATION

(71) Applicant: AEVA, INC., Mountain View, CA (US)

(72) Inventors: Da An, San Francisco, CA (US); Jose Krause Perin, Mountain View, CA (US); Kumar Bhargav Viswanatha, Santa Clara, CA (US); Mina Rezk, Haymarket, VA (US)

(73) Assignee: Aeva, Inc., Mountain View, CA (US)

( * ) Notice: Subject to any disclaimer, the term of this patent is extended or adjusted under 35 U.S.C. 154(b) by 0 days.

(21) Appl. No.: 17/952,602

(22) Filed: Sep. 26, 2022

(51) Int. Cl.
| | |
|---|---|
| *G01S 7/497* | (2006.01) |
| *G01S 17/34* | (2020.01) |
| *G01S 17/89* | (2020.01) |
| *G01S 7/481* | (2006.01) |
| *G01S 17/931* | (2020.01) |

(52) U.S. Cl.
CPC .......... *G01S 7/497* (2013.01); *G01S 7/4817* (2013.01); *G01S 17/34* (2020.01); *G01S 17/89* (2013.01); *G01S 17/931* (2020.01)

(58) Field of Classification Search
CPC ........ G01S 7/497; G01S 7/4817; G01S 17/34; G01S 17/89; G01S 17/931
See application file for complete search history.

(56) References Cited

U.S. PATENT DOCUMENTS

| | | | | | |
|---|---|---|---|---|---|
| 10,502,833 | B2 * | 12/2019 | Sebastian | ............... | G01S 17/58 |
| 11,353,558 | B2 * | 6/2022 | Maleki | ............... | G01S 17/34 |
| 2016/0291137 | A1 * | 10/2016 | Sakimura | ............. | G01S 7/4815 |
| 2019/0317219 | A1 * | 10/2019 | Smith | .................. | G01S 7/4802 |
| 2020/0309952 | A1 * | 10/2020 | Imaki | .................... | G01S 17/58 |
| 2022/0146676 | A1 * | 5/2022 | Armstrong-Crews | | ...................... G01S 17/89 |

* cited by examiner

*Primary Examiner* — Luke D Ratcliffe
*Assistant Examiner* — Jempson Noel
(74) *Attorney, Agent, or Firm* — Womble Bond Dickinson (US) LLP (57) ABSTRACT

A method including receiving, responsive to a transmission of a plurality of optical beams into an environment including a target, a plurality of returned optical beams associated with the target. The method includes generating a plurality of points from the plurality of returned optical beams, wherein each one of the plurality of points respectively corresponds to one of the plurality of returned optical beams; selecting a first point from the plurality of points and a second point from the plurality of points. The method includes identifying, by a processor, an orientation of the first point relative to the FMCW LIDAR system based on the second point from the plurality of points. The method includes computing an orientation of the target relative to the FMCW LIDAR system based on the orientation of the first point; and generating a point cloud based on the orientation of the target.

11 Claims, 9 Drawing Sheets

TECHNIQUES FOR TARGET ORIENTATION ESTIMATION

TECHNICAL FIELD

The present disclosure relates generally to optical detection, and more particularly to systems and methods for target orientation estimation in a frequency-modulated continuous wave (FMCW) light detection and ranging (LIDAR) system.

BACKGROUND

A LIDAR system includes an optical scanner to transmit an FMCW infrared (IR) optical beam and to receive a return signal from reflections of the optical beam; an optical processing system coupled with the optical scanner to generate a baseband signal in the time domain from the return signal, where the baseband signal includes frequencies corresponding to LIDAR target ranges; and a signal processing system coupled with the optical processing system to measure energy of the baseband signal in the frequency domain, to compare the energy to an estimate of LIDAR system noise, and to determine a likelihood that a signal peak in the frequency domain indicates a detected target. Conventional LIDAR systems generate a 3-D point cloud of the sensor's field-of-view, and then use the 3-D point cloud to determine an orientation of the target.

SUMMARY

One aspect disclosed herein is directed to a method of computing an orientation of a target in a frequency-modulated continuous wave (FMCW) light detection and ranging (LIDAR) system. In some embodiments, the method includes receiving, responsive to a transmission of a plurality of optical beams into an environment including a target, a plurality of returned optical beams associated with the target. In some embodiments, the method includes generating a plurality of points from the plurality of returned optical beams, wherein each one of the plurality of points respectively corresponds to one of the plurality of returned optical beams. In some embodiments, the method includes selecting a first point from the plurality of points and a second point from the plurality of points. In some embodiments, the method includes determining, by a processor, an orientation of the first point relative to the FMCW LIDAR system based on the second point from the plurality of points. In some embodiments, the method includes computing an orientation of the target relative to the FMCW LIDAR system based on the orientation of the first point. In some embodiments, the method includes generating a point cloud based on the orientation of the target.

In some embodiments, the method includes identifying a first returned optical beam from the plurality of returned optical beams that corresponds to the first point. In some embodiments, the method includes computing a first beat frequency of the first returned optical beam based on a time at which the first returned optical beam is received. In some embodiments, the method includes identifying a second returned optical beam of the plurality of returned optical beams that corresponds to a second one of the plurality of points. In some embodiments, the method includes computing a second beat frequency of the second returned optical beam based on a time at which the second returned optical beam is received. In some embodiments, the method includes computing a velocity error based on a difference between the first beat frequency and the second beat frequency. In some embodiments, the method includes transforming the velocity error to the orientation of the first point based on a predefined translation function.

In some embodiments, the method includes computing a plurality of beat frequencies associated with the plurality of returned optical beams based on a plurality of times at which each one of the plurality of beams is received. In some embodiments, the method includes transforming the plurality of beat frequencies into a frequency spectrum plot in frequency space. In some embodiments, the method includes calculating a peak width of the frequency spectrum plot. In some embodiments, the method includes translating the peak width to the orientation of the first point based on a predefined translation function.

In some embodiments, the method includes identifying a Fast Fourier Transform (FFT) integration time associated with the plurality of returned optical beams. In some embodiments, the method includes identifying a scanner speed associated with the plurality of returned optical beams. In some embodiments, the method includes transforming the peak width into a normalized peak width based on the FFT integration time and the scanner speed. In some embodiments, the method includes utilizing the normalized peak width to determine the orientation of the first point.

In some embodiments, the method includes calculating a plurality of peak widths, wherein each one of the plurality of peak widths is associated with one of the plurality of points. In some embodiments, the method includes transforming the plurality of peak widths into a plurality of normalized peak widths. In some embodiments, the method includes aggregating the plurality of normalized peak widths into a normalized peak width distribution. In some embodiments, the method includes translating the normalized peak width distribution to the orientation of the first point.

In some embodiments, the method includes identifying a first one of the plurality of points associated with a first one of a plurality of lasers that transmits a first optical beam from the plurality of optical beams, which is associated with a first returned optical beam from the plurality of returned optical beams. In some embodiments, the method includes computing a first beat frequency of the first returned optical beam based on a time at which the first returned optical beam is received. In some embodiments, the method includes identifying a second one of the plurality of points associated with a second one of the plurality of lasers that transmits a second optical beam from the plurality of optical beams, wherein the second optical beam is associated with a second returned optical beam from the plurality of returned optical beams. In some embodiments, the method includes computing a second beat frequency of the second returned optical beam based on a time at which the second returned optical beam is received. In some embodiments, the method includes determining a frequency difference between the first beat frequency and the second beat frequency. In some embodiments, the method includes translating the frequency difference to the orientation of the first point based on a predefined translation function.

In some embodiments, the target is a moving target, and the method includes determining a shape of the moving target based on the orientation of the moving target. In some embodiments, the method includes generating the point cloud based on the shape of the moving target.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects, and advantages will become apparent from the following detailed description taken in conjunction with the accompanying figures which illustrate, by way of example, the principles of some described example implementations.

BRIEF DESCRIPTION OF THE FIGURES

Embodiments and implementations of the present disclosure will be understood more fully from the detailed description given below and from the accompanying drawings of various aspects and implementations of the disclosure, which, however, should not be taken to limit the disclosure to the specific embodiments or implementations, but are for explanation and understanding only.

DETAILED DESCRIPTION

According to some embodiments, the described LIDAR system described herein may be implemented in any sensing market, such as, but not limited to, transportation, manufacturing, metrology, medical, virtual reality, augmented reality, and security systems. According to some embodiments, the described LIDAR system is implemented as part of a front-end of frequency modulated continuous-wave (FMCW) device that assists with spatial awareness for automated driver assist systems, or self-driving vehicles.

As discussed above, conventional approaches to determine an orientation of the target using the 3D point cloud (point cloud data). These approaches, however, suffer from computation and latency limitations. The present disclosure addresses the above challenges, among others, by providing embodiments that determine a target orientation using raw data to provide faster target orientation estimations (pitch and/or yaw) and reduce computation latencies.

Figure 1:
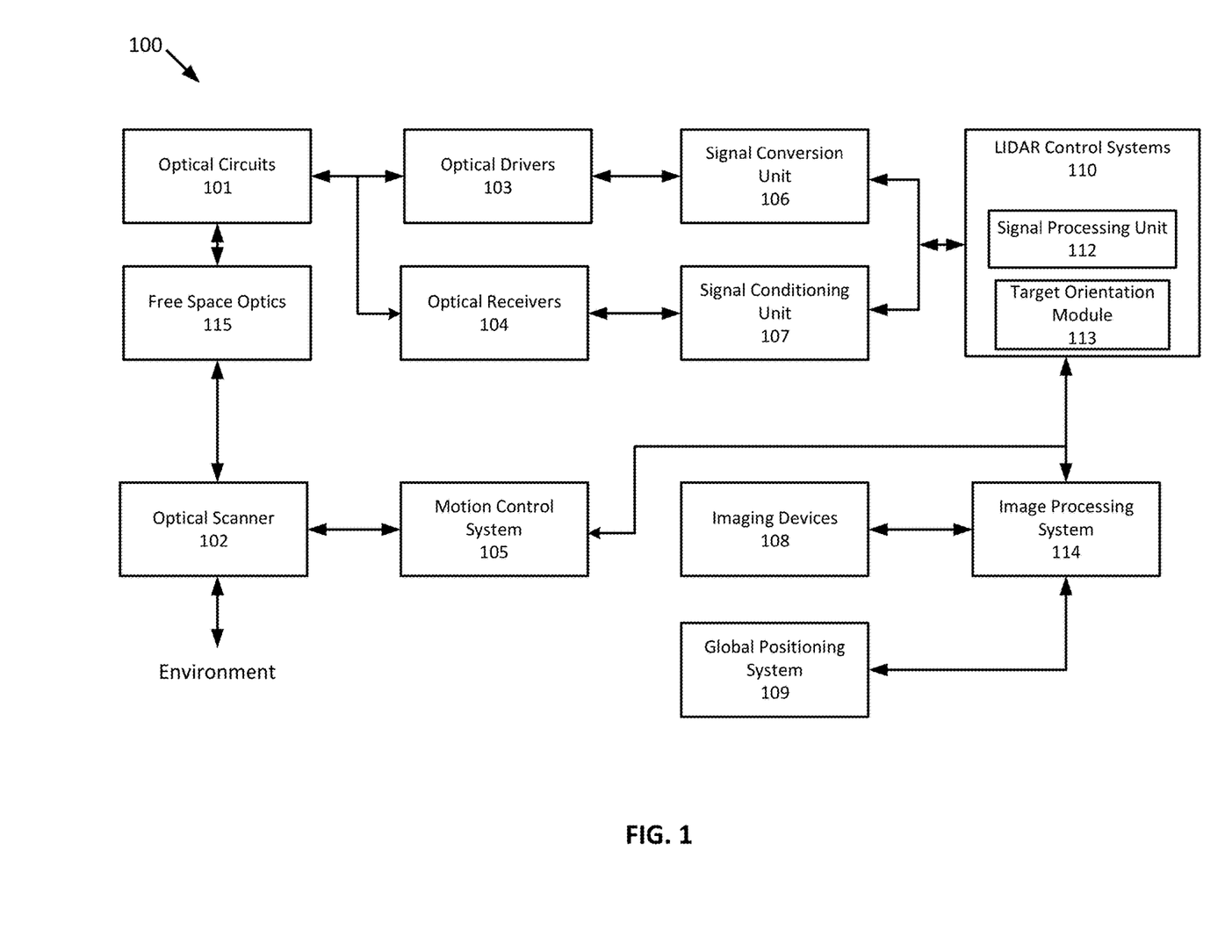
FIG. 1 is a block diagram illustrating an example of a LIDAR system, according to some embodiments.

FIG. 1 is a block diagram illustrating an example of a LIDAR system, according to some embodiments. The LIDAR system 100 includes one or more of each of a number of components, but may include fewer or additional components than shown in FIG. 1. One or more of the components depicted in FIG. 1 can be implemented on a photonics chip, according to some embodiments. The optical circuits 101 may include a combination of active optical components and passive optical components. Active optical components may generate, amplify, and/or detect optical signals and the like. In some examples, the active optical component includes optical beams at different wavelengths, and includes one or more optical amplifiers, one or more optical detectors, or the like. In some embodiments, one or more LIDAR systems 100 may be mounted onto any area (e.g., front, back, side, top, bottom, and/or underneath) of a vehicle to facilitate the detection of a target in any free-space relative to the vehicle. In some embodiments, the vehicle may include a steering system and a braking system, each of which may work in combination with one or more LIDAR systems 100 according to any information (e.g., one or more rigid transformations, distance/ranging information, Doppler information, etc.) acquired and/or available to the LIDAR system 100. In some embodiments, the vehicle may include a vehicle controller that includes the one or more components and/or processors of the LIDAR system 100.

Free space optics 115 may include one or more optical waveguides to carry optical signals, and route and manipulate optical signals to appropriate input/output ports of the active optical circuit. In embodiments, the one or more optical waveguides may include one or more graded index waveguides, as will be described in additional detail below at FIGS. 3-6. The free space optics 115 may also include one or more optical components such as taps, wavelength division multiplexers (WDM), splitters/combiners, polarization beam splitters (PBS), collimators, couplers or the like. In some examples, the free space optics 115 may include components to transform the polarization state and direct received polarized light to optical detectors using a PBS, for example. The free space optics 115 may further include a diffractive element to deflect optical beams having different frequencies at different angles along an axis (e.g., a fast-axis).

In some examples, the LIDAR system 100 includes an optical scanner 102 that includes one or more scanning mirrors that are rotatable along an axis (e.g., a slow-axis) that is orthogonal or substantially orthogonal to the fast-axis of the diffractive element to steer optical signals to scan an environment according to a scanning pattern. For instance, the scanning mirrors may be rotatable by one or more galvanometers. Objects in the target environment may scatter an incident light into a return optical beam or a target return signal. The optical scanner 102 also collects the return optical beam or the target return signal, which may be returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coated window or the like.

To control and support the optical circuits 101 and optical scanner 102, the LIDAR system 100 includes LIDAR control systems 110. The LIDAR control systems 110 may include a processor for the LIDAR system 100. In some examples, the processor may be one or more general-purpose processors such as a microprocessor, central processing unit, or the like. More particularly, the processor may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processor may also be one or more special-purpose processors such as an application specific integrated circuit (ASIC), a field programmable gate array (FPGA), a digital signal processor (DSP), network processor, or the like.

In some examples, the LIDAR control system 110 may include a processor that may be implemented with a DSP, such as signal processing unit 112. The LIDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

The LIDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LIDAR control systems 110 to signals interpretable by the galvanometers in the optical scanner 102. In some examples, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LIDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LIDAR control systems 110. In some examples, the signals from the optical receivers 104 may be subject to signal conditioning by signal conditioning unit 107 prior to receipt by the LIDAR control systems 110. For example, the signals from the optical receivers 104 may be provided to an operational amplifier for amplification of the received signals and the amplified signals may be provided to the LIDAR control systems 110.

In some applications, the LIDAR system 100 may additionally include one or more imaging devices 108 configured to capture images of the environment, a global positioning system 109 configured to provide a geographic location of the system, or other sensor inputs. The LIDAR system 100 may also include an image processing system 114. The image processing system 114 can be configured to receive the images and geographic location, and send the images and location or information related thereto to the LIDAR control systems 110 or other systems connected to the LIDAR system 100.

In operation according to some examples, the LIDAR system 100 is configured to use nondegenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LIDAR control systems 110. The LIDAR control systems 110 instruct, e.g., via signal processor unit 112, the optical drivers 103 to independently modulate one or more optical beams, and these modulated signals propagate through the optical circuits 101 to the free space optics 115. The free space optics 115 directs the light at the optical scanner 102 that scans a target environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected back from an environment pass through the optical circuits 101 to the optical receivers 104. Because the polarization of the light has been transformed, it may be reflected by a polarization beam splitter along with the portion of polarized light that was reflected back to the optical circuits 101. In such scenarios, rather than returning to the same fiber or waveguide serving as an optical source, the reflected signals can be reflected to separate optical receivers 104. These signals interfere with one another and generate a combined signal. The combined signal can then be reflected to the optical receivers 104. Also, each beam signal that returns from the target environment may produce a time-shifted waveform. The temporal phase difference between the two waveforms generates a beat frequency measured on the optical receivers 104 (e.g., photodetectors).

The analog signals from the optical receivers 104 are converted to digital signals by the signal conditioning unit 107. These digital signals are then sent to the LIDAR control systems 110. A signal processing unit 112 may then receive the digital signals to further process and interpret them. In some embodiments, the signal processing unit 112 also receives position data from the motion control system 105 and galvanometers (not shown) as well as image data from the image processing system 114. The signal processing unit 112 can then generate 3D point cloud data (sometimes referred to as, "a LIDAR point cloud") that includes information about range and/or velocity points in the target environment as the optical scanner 102 scans additional points. In some embodiments, a LIDAR point cloud may correspond to any other type of ranging sensor that is capable of Doppler measurements, such as Radio Detection and Ranging (RADAR). The signal processing unit 112 can also overlay 3D point cloud data with image data to determine velocity and/or distance of objects in the surrounding area. The signal processing unit 112 also processes the satellite-based navigation location data to provide data related to a specific global location.

In some embodiments, signal processing unit 112 executes code stored in memory in LIDAR control systems 110, such as target orientation module 113, to perform functions to determine an orientation of a target discussed herein.

Figure 2:
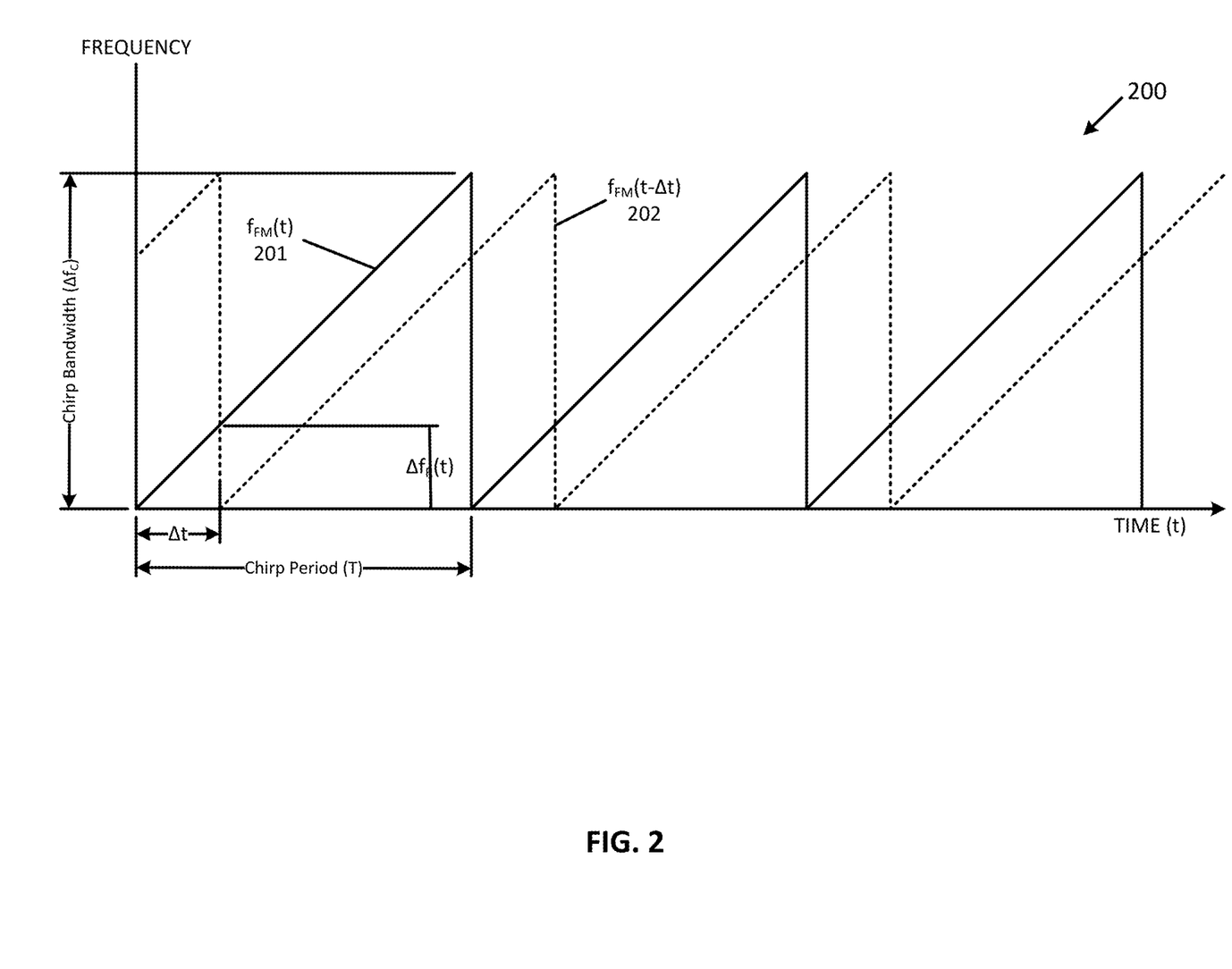
FIG. 2 is a time-frequency diagram illustrating an example of an FMCW scanning signal that can be used by a LIDAR system to scan a target environment, according to some embodiments.

FIG. 2 is a time-frequency diagram illustrating an example of an FMCW scanning signal that can be used by a LIDAR system to scan a target environment, according to some embodiments. In one example, the scanning waveform 201, labeled as $f_{FM}(t)$, is a sawtooth waveform (sawtooth "chirp") with a chirp bandwidth Mc and a chirp period $T_C$. The slope of the sawtooth is given as $k=(\Delta f_C/T_C)$. FIG. 2 also depicts target return signal 202 according to some embodiments. Target return signal 202, labeled as $f_{FM}(t-\Delta t)$, is a time-delayed version of the scanning signal 201, where $\Delta t$ is the round trip time to and from a target illuminated by scanning signal 201. The round trip time is given as $\Delta t=2R/v$, where R is the target range and v is the velocity of the optical beam, which is the speed of light c. The target range, R, can therefore be calculated as $R=c(\Delta t/2)$. When the return signal 202 is optically mixed with the scanning signal, a range-dependent difference frequency ("beat frequency") $\Delta f_R(t)$ is generated. The beat frequency $\Delta f_R(t)$ is linearly related to the time delay $\Delta t$ by the slope of the sawtooth k. That is, $\Delta f_R(t)=k\Delta t$. Since the target range R is proportional to $\Delta t$, the target range R can be calculated as $R=(c/2)(\Delta f_R(t)/k)$. That is, the range R is linearly related to the beat frequency $\Delta f_R(t)$. The beat frequency $\Delta f_R(t)$ can be generated, for example, as an analog signal in optical receivers 104 of system 100. The beat frequency can then be digitized by an analog-to-digital converter (ADC), for example, in a signal conditioning unit such as signal conditioning unit 107 in LIDAR system 100. The digitized beat frequency signal can then be digitally processed, for example, in a signal processing unit, such as signal processing unit 112 in system 100. It should be noted that the target return signal 202 will, in general, also include a frequency offset (Doppler shift) if the target has a velocity relative to the LIDAR system 100. The Doppler shift can be determined separately, and used to correct (e.g., adjust, modify) the frequency of the return signal, so the Doppler shift is not shown in FIG. 2 for simplicity and ease of explanation. For example, LIDAR system 100 may correct the frequency of the return signal by removing (e.g., subtracting, filtering) the Doppler shift from the frequency of the returned signal to generate a corrected return signal. The LIDAR system 100 may then use the corrected return signal to calculate a distance and/or range between the LIDAR system 100 and the object. In some embodiments, the Doppler frequency shift of target return signal 202 that is associated with a target may be indicative of a velocity and/or movement direction of the object relative to the LIDAR system 100.

It should also be noted that the sampling frequency of the ADC will determine the highest beat frequency that can be processed by the system without aliasing. In general, the highest frequency that can be processed is one-half of the sampling frequency (i.e., the "Nyquist limit"). In one example, and without limitation, if the sampling frequency of the ADC is 1 gigahertz, then the highest beat frequency that can be processed without aliasing ($\Delta f_{Rmax}$) is 500 megahertz. This limit in turn determines the maximum range of the system as $R_{max}=(c/2)(\Delta f_{Rmax}/k)$ which can be adjusted by changing the chirp slope k. In one example, while the data samples from the ADC may be continuous, the subsequent digital processing described below may be partitioned into "time segments" that can be associated with some periodicity in the LIDAR system 100. In one example, and without limitation, a time segment might correspond to a predetermined number of chirp periods T, or a number of full rotations in azimuth by the optical scanner.

Figure 3:
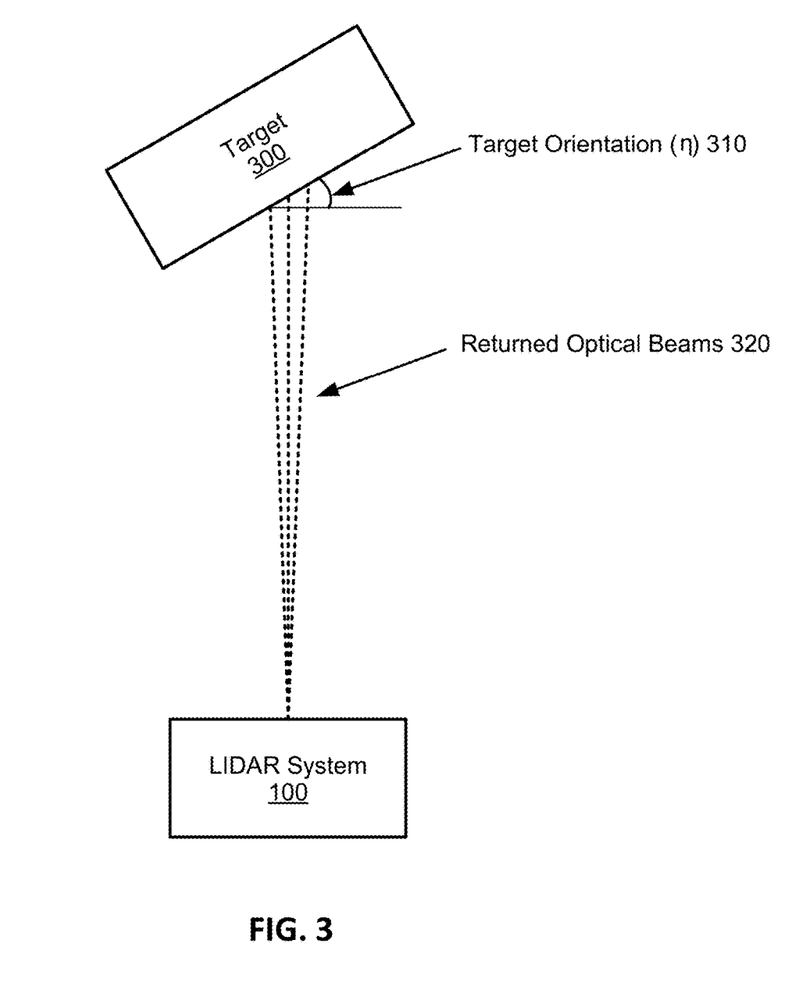
FIG. 3 is a block diagram illustrating an example for target orientation estimation of a target, according to some embodiments.

FIG. 3 is a block diagram depicting an example for target orientation estimation of a target, according to some embodiments. FIG. 3 shows that target 300 is positioned at a relative angle η to LIDAR system 100. It should be appreciated that, as used herein, 'object' and 'target' may be used interchangeably. LIDAR system 100 includes one or more optical sources with the functionality to transmit optical beams and one or more sensors that include the functionality to receive returned optical beams 320. As described herein, embodiments of the present disclosure provide several approaches to determine target orientation 310 based on returned optical beams 320. In one approach, LIDAR system 100 includes the functionality to use a velocity variance approach to determine target orientation 310. In this approach, LIDAR system 100 can measure velocity errors (differences) between returned optical beams 320 to determine target orientation 310 (see FIG. 4 and corresponding text for further details). In another approach, LIDAR system 100 includes the functionality to use a peak-width approach to determine target orientation 310. In this approach, LIDAR system 100 can generate a normalized peak width distribution based on FFT integrations of returned optical beams 320 (see FIGS. 5A, 5B, 6, and corresponding text for further details). In another approach, LIDAR system 100 includes the functionality to use a multi-laser separation approach to determine target orientation 310. In this approach, LIDAR system 100 transmits two optical beams from two optical sources and computes beat frequency differences between the corresponding returned optical beans 320 (see, e.g., FIGS. 7, 8, and corresponding text for further details).

Figure 4:
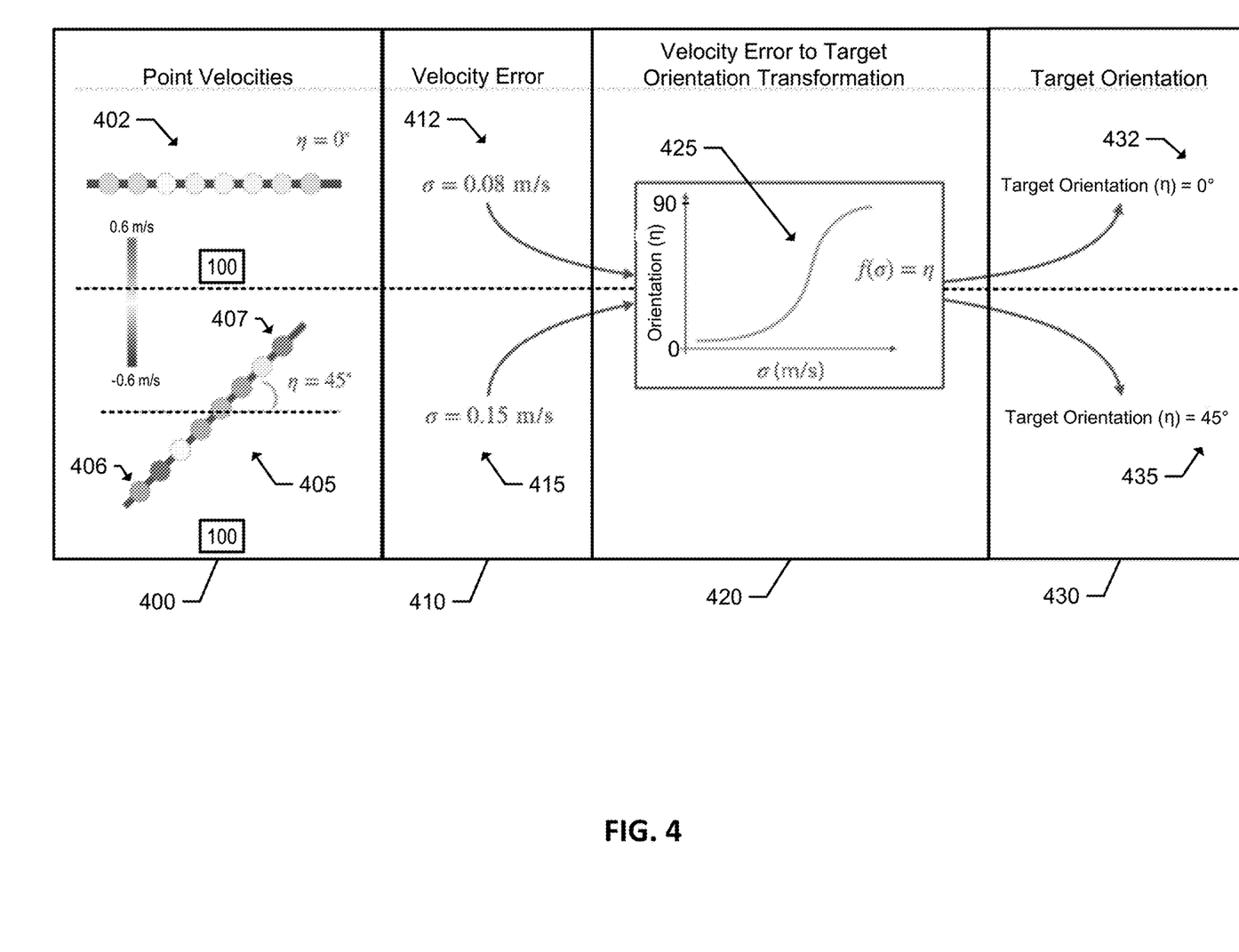
FIG. 4 is a block diagram illustrating an example for determining target orientation based on velocity error, according to some embodiments.

FIG. 4 is a block diagram depicting an example for determining target orientation based on velocity error, according to some embodiments. Section 400 shows two different target orientations 402 and 405. Orientation 402 has a 0° angle measured relative to LIDAR system 100 and shows eight points where transmitted optical beams are reflected and produce corresponding returned optical beams. Due to the fact that the orientation angle is 0 degrees, the difference in the distance covered by the beam spot size for each of the eight different points and LIDAR system 100 is minimal. As such, the difference in velocity (e.g., amount of time to receive the returned optical beam) of the corresponding returned optical beams is minimal.

Orientation 405, however, has a 45° angle measured relative to LIDAR system 100. Due to the fact that the orientation angle is 45°, the difference in the distance covered by the beam spot size for each of the eight different points and LIDAR system 100 has increased. For example, given the same target distance relative to LIDAR system 100, point 406 corresponds to a larger physical beam spot size than any point on orientation 402. As such, the difference in velocity of their corresponding returned optical beams is increased.

Section 410 shows the velocity errors of the two embodiments measured by target orientation module 113 when executed by signal processing unit 112. The velocity errors are 0.08 m/s (412) for the 0° offset embodiment and 0.15 m/s (415) for the 45° offset embodiment. Section 420 shows, in one embodiment, that measured velocity error is mapped as function 425 to a target slant with respect to the LiDAR system. Velocity error may be defined as:

$$\sigma = \sqrt{\frac{\sum(x_i - \mu)^2}{N}}$$

Where the standard deviation of the instantaneous velocities, is defined for N points as:

$$\frac{1}{n}\sum_{i=1}^{n}|x_i - m(X)|$$

In one embodiment, target orientation module 113, when executed by signal processing unit 112, uses a time-triggered approach (e.g., fixed number of near-neighbors) on the region in which the velocity error is accumulated and calculated, such as a rolling calculation. In one embodiment, target orientation module 113, when executed by signal processing unit 112, uses a spatial-triggered approach (e.g., through edge detection on the target) on the region in which the velocity error is accumulated and calculated.

Function 425 that may be used to derive the target orientation given the above parameters that, in one embodiment, is an absolute value of the target orientation where the orientation angle increases as the velocity error increases. Section 430 shows that LIDAR system 100 uses function 425 to determine target orientation 432 and 435 based on velocity errors 412 and 415, respectively.

Figures 5A, 5B:
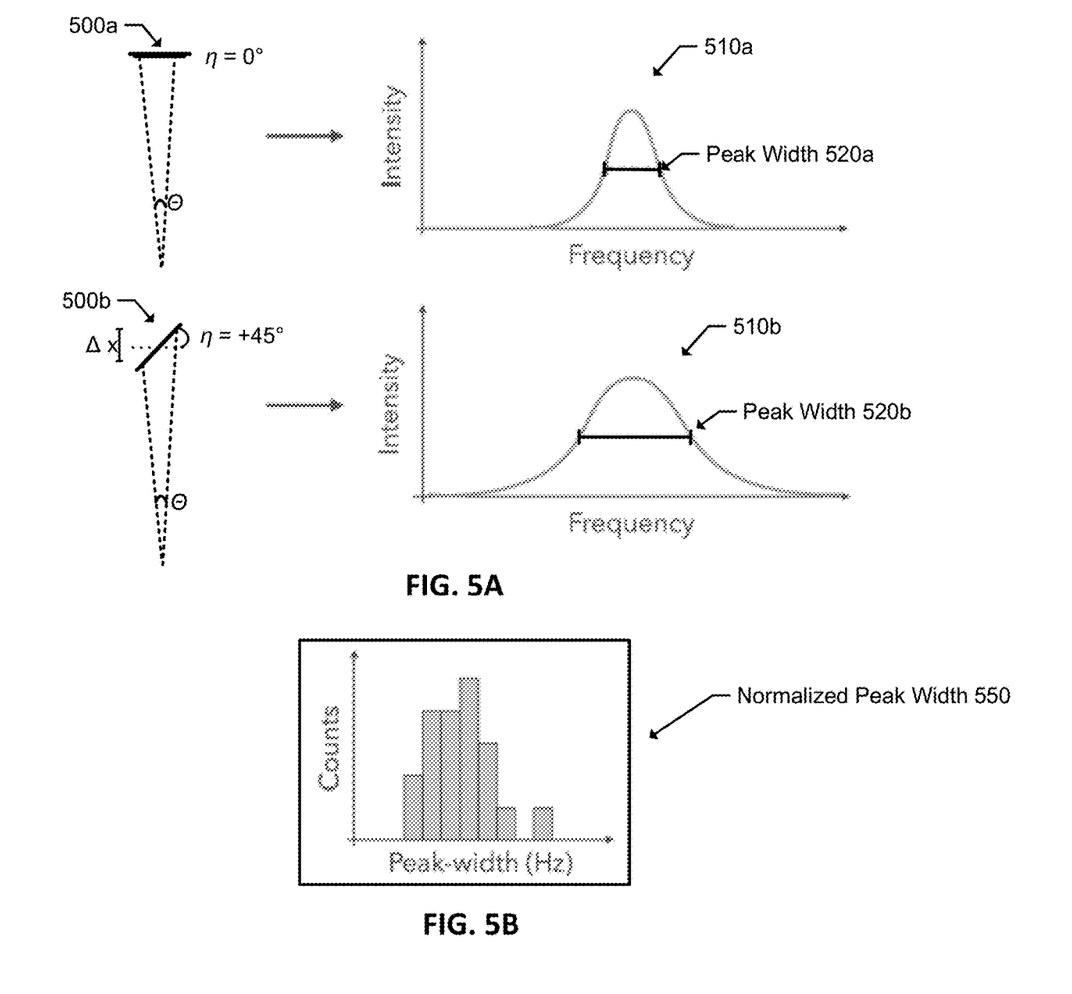
FIGS. 5A and 5B are diagrams illustrating examples for determining target orientation based on peak width using raw data, according to some embodiments.

FIGS. 5A and 5B are diagrams depicting an example for determining target orientation based on peak width using raw data, according to some embodiments. In some embodiments, operations to determine target orientation based on peak width using raw data may be performed by a signal processing unit, such as signal processing unit 112 when executing target orientation module 113 (software code) in FIG. 1.

Referring to FIG. 5A, diagram 500a is a top-down view of a target that is normal to LIDAR system 100, and diagram 500b is top-down view of a target that is tilted at +45° to LIDAR system 100. LIDAR system 100 (e.g., optical scanner 102) performs azimuth scans and receives returned optical beams. Signal processing unit 112, when executing code in target orientation module 113, performs an FFT transformation on the returned optical beams to generate graph 510a.

Graph 510a has peak width 520a, which refers to the width of the FFT transformation. In some embodiments, target orientation module 113, when executed by signal processing unit, includes the functionality to perform several different types of calculations to characterize the peak width, such as FWHM (full width at half maximum), baseline width between tangent-line inflection points, ratio of area-to-height, and/or a calculated from Gaussian fit. Two variables contribute to the width of the FFT transformation. The first variable is the divergence of the beam itself. When the beam hits a target somewhere, a spot size is generated that produces a physical peak width. The second variable is the resultant FFT length or integration time over the surface of the target. In one embodiment, optical scanner 102 is a polygon system that continuously scans for returned optical beams within the integration time. In this embodiment, looking at a fixed target generates scan distance data (angular distance data). When the target is normal to LIDAR system 100 (500a), the range of what the laser sweeps is fairly consistent.

However, referring to diagram 500b, when the target is at an angle to LIDAR system 100, the beginning of the sweep and the end of the sweep are at different ranges (Δx). As such, when LIDAR system 100 performs the FFT transformation on the returned optical beams, the peak width becomes wider. Graph 510b shows that peak width 520b is wider than peak width 520a.

In some embodiments, the peak width is also based on two controllable contributing factors, which are the FFT integration time for each point and optical scan speed. The peak width decreases with a short integration time and slow scan speed, and increases with a long integration time and fast scan speed. To account for the FFT integration time and the scan speed, signal processing unit 112, when executing code in target orientation module 113, computes a normalized peak width 550 shown in FIG. 5B, which removes the FFT integration time and scan speed. In turn signal processing unit 112, when executing code in target orientation module 113, determines a region of aggregation and generates a normalized peak-width distribution, which signal processing unit 112, when executing code in target orientation module 113, utilizes to determine the target orientation (see FIG. 6 and corresponding test for further details).

Figure 6:
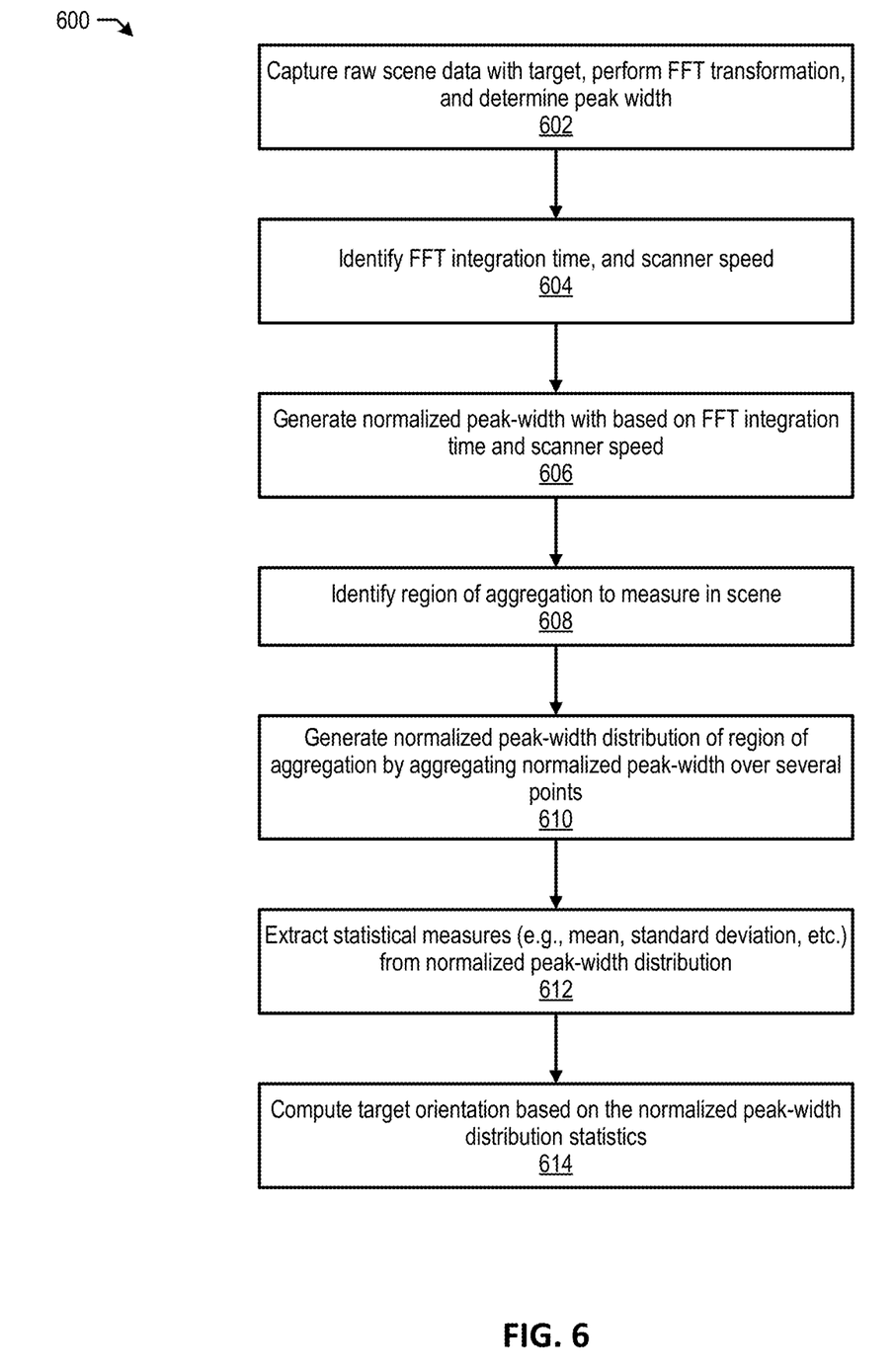
FIG. 6 is a flow diagram illustrating an example method for determining target orientation based on peak width, according to some embodiments.

FIG. 6 is a flow diagram depicting an example method for determining target orientation based on peak width, according to some embodiments. Additional, fewer, or different operations may be performed in the method depending on the particular arrangement. In some embodiments, some or all operations of method 600 may be performed by one or more processors executing on one or more computing devices, systems, or servers (e.g., remote/networked servers or local servers). In some embodiments, method 600 may be performed by a signal processing unit, such as signal processing unit 112 when executing target orientation module 113 (software code) in FIG. 1. Each operation may be re-ordered, added, removed, or repeated.

In some embodiments, the method 600 may include the operation 602 of signal processing unit 112, when executing code in target orientation module 113, capturing raw scene data with a target (e.g., returned optical beams), performing an FFT transformation on the raw scene data, and determining a peak width of the FFT transformation. In some embodiments, the method 600 may include the operation 604 of signal processing unit 112, when executing code in target orientation module 113, identifying an FFT integration time and scanner speed corresponding to the captured raw scene data. In some embodiments, the method 600 may include the operation 606 of signal processing unit 112, when executing code in target orientation module 113, generating a normalized peak-width by calibrating the FFT transformation based on the FFT integration time and scanner speed. As discussed above, the measured raw peak-width, $w_p$, depends on the target orientation angle, the FFT integration time ($\tau_{FFT}$), and the scanner speed ($\omega_{scan}$). To isolate the target orientation angle dependence, the raw peak-width is calibrated with respect to the known values of the FFT integration time ($\tau_{FFT}$), and the scanner speed ($\omega_{scan}$). The result is a normalized peak-width, $\hat{w}_p$, which depends only on the target orientation:

$$\hat{w}_p = f(w_p, \tau_{FFT}, \omega_{scan})$$

In some embodiments, the method 600 may include the operation 608 of signal processing unit 112, when executing code in target orientation module 113, identifying a region of aggregation to measure in the scene. In some embodiments, the method 600 may include the operation 610 of signal processing unit 112, when executing code in target orientation module 113, generating a normalized peak-width distribution ($\hat{W}_p$) of the region of aggregation by aggregating the normalized peak-width over several points. The normalized peak-width, $\hat{w}_p$, is aggregated over several points (chosen as a fixed number of near-neighbors), which results in a normalized peak-width distribution, $\hat{W}_p$.

In some embodiments, the method 600 may include the operation 612 of signal processing unit 112, when executing code in target orientation module 113, extracting statistical measures from the normalized peak-width distribution $\hat{W}_p$. In some embodiments, the extracted statistical measures are a mean, $\mu_w$ and standard deviation $\sigma_w$. In some embodiments, the method 600 may include the operation 614 of computing a target orientation based on the normalized peak-width distribution statistics. Finally, the target orientation angle is calculated from a mathematical function of the distribution statistics:

$$\eta = f(\hat{W}_p), \text{ for example: } \eta = f(\mu_w, \sigma_w)$$

Figure 7:
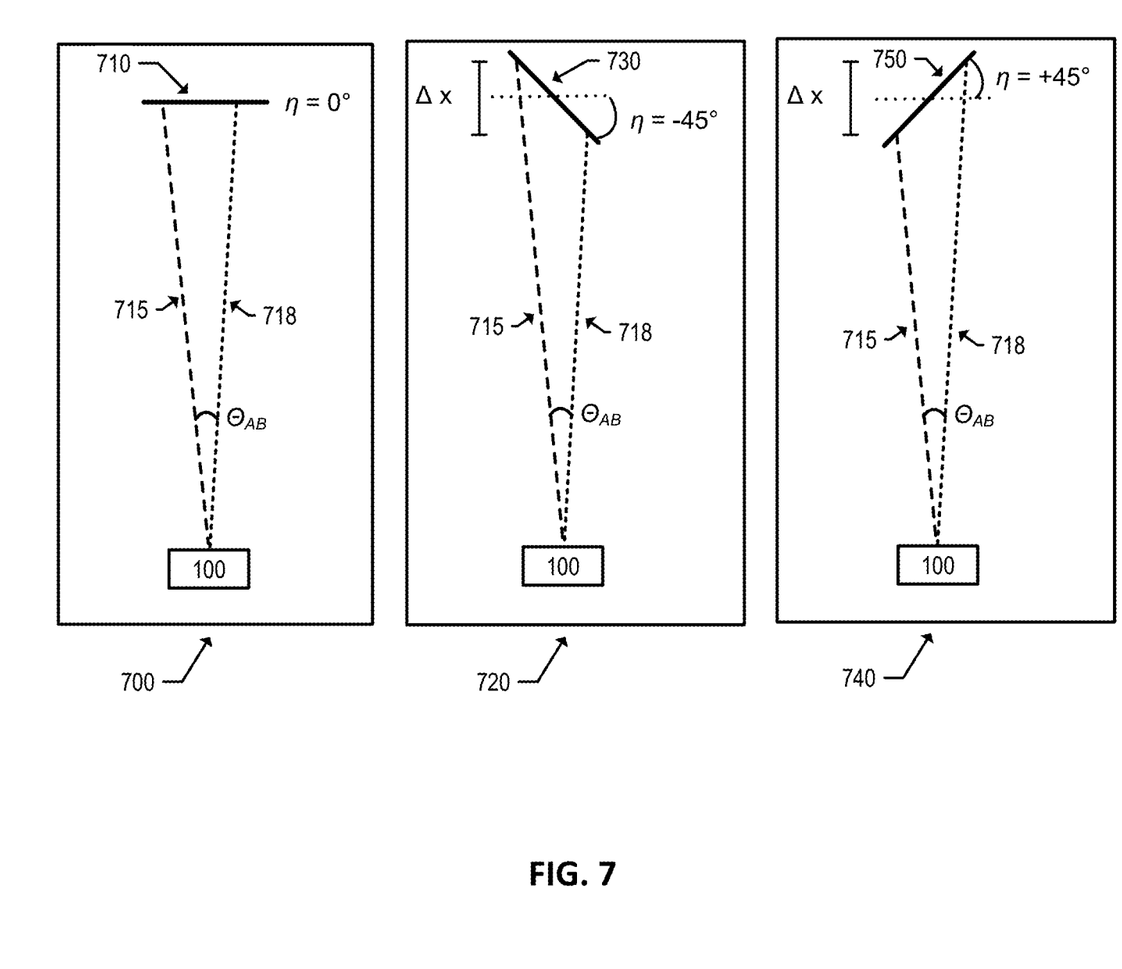
FIG. 7 is a block diagram illustrating an example for determining target orientation based on a multi-laser separation approach, according to some embodiments.

FIG. 7 is a block diagram depicting an example for determining target orientation based on a dual-laser separation approach. Using the dual-laser separation approach, LIDAR system 100 may distinguish between negative and positive target orientations, such as diagrams 720 and 740 respectively.

Diagram 700 shows that LIDAR system 100 has two lasers 715 and 718 offset by a pre-determined angle $\Theta_{ab}$. In the normal target orientation, lasers 715 and 718 have the same range to target 710. However, when the target is tilted, such as in diagrams 720 and 740, lasers 715 and 718 have different ranges to targets 730 and 750 and, in turn, result in a beat frequency difference. Based on the beat frequency difference, LIDAR system 100 uses a mathematical function to determine the target orientation (see FIG. 8 and corresponding text for further details).

Figure 8:
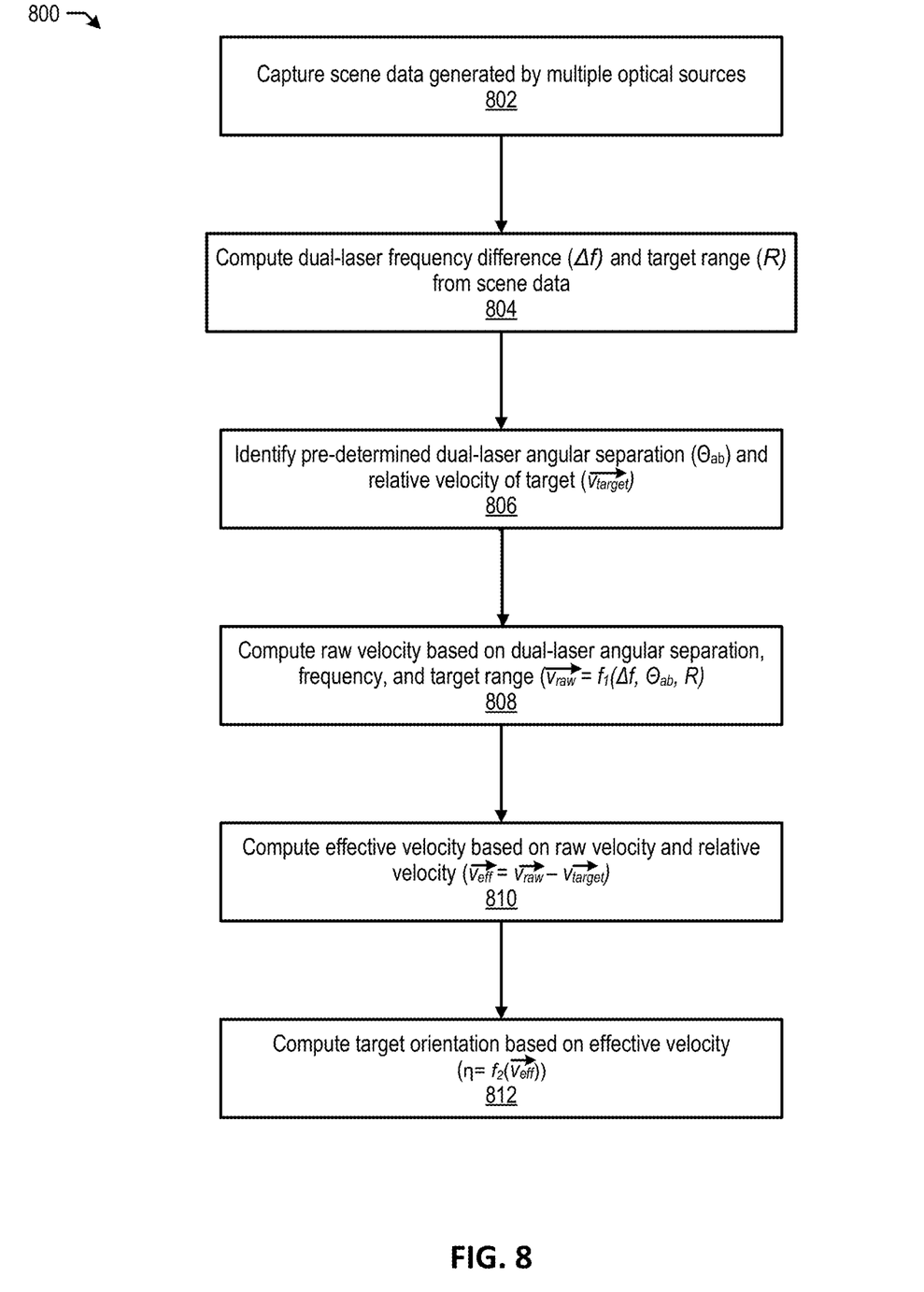
FIG. 8 is a flow diagram illustrating an example method for determining target orientation based on multi-laser separation, according to some embodiments.

FIG. 8 is a flow diagram depicting an example method for determining target orientation based on dual-laser separation. Additional, fewer, or different operations may be performed in the method depending on the particular arrangement. In some embodiments, some or all operations of method 800 may be performed by one or more processors executing on one or more computing devices, systems, or servers (e.g., remote/networked servers or local servers). In some embodiments, method 800 may be performed by a signal processing unit, such as signal processing unit 112 when executing target orientation module 113 (software code) in FIG. 1. Each operation may be re-ordered, added, removed, or repeated. In some embodiments, LIDAR system 100 may distinguish between positive and negative target orientation using the dual-laser separation approach. In some embodiments, the two lasers are offset by some angle $\Theta_{ab}$ as shown in FIG. 7.

In some embodiments, the method 800 may include the operation 802 of capturing scene data (returned optical beams) generated by the two optical sources. In some embodiments, the method 800 may include the operation 804 of computing a dual-laser beat frequency difference ($\Delta f$) and target range (R) from the scene data based on their beat frequency difference.

In some embodiments, the method 800 may include the operation 806 of identifying the pre-determined dual-laser angular separation ($\Theta_{ab}$) and relative velocity of the target ($\vec{v}_{target}$). In some embodiments, the method 800 may include the operation 808 of computing raw velocity based on the dual-laser angular separation, beat frequency, and target range using, for example, the formula ($\vec{v}_{raw} = f_1(\Delta f, \Theta_{ab}, R)$). In some embodiments, the method 800 may include the operation 810 of computing an effective velocity based on raw velocity and relative velocity using, for example, the formula ($\vec{v}_{eff} = \vec{v}_{raw} - \vec{v}_{target}$). In some embodiments, the method 800 may include the operation 812 of computing a target orientation based on effective velocity using, for example, the formula ($\eta = f_2(\vec{v}_{eff})$).

Figure 9:
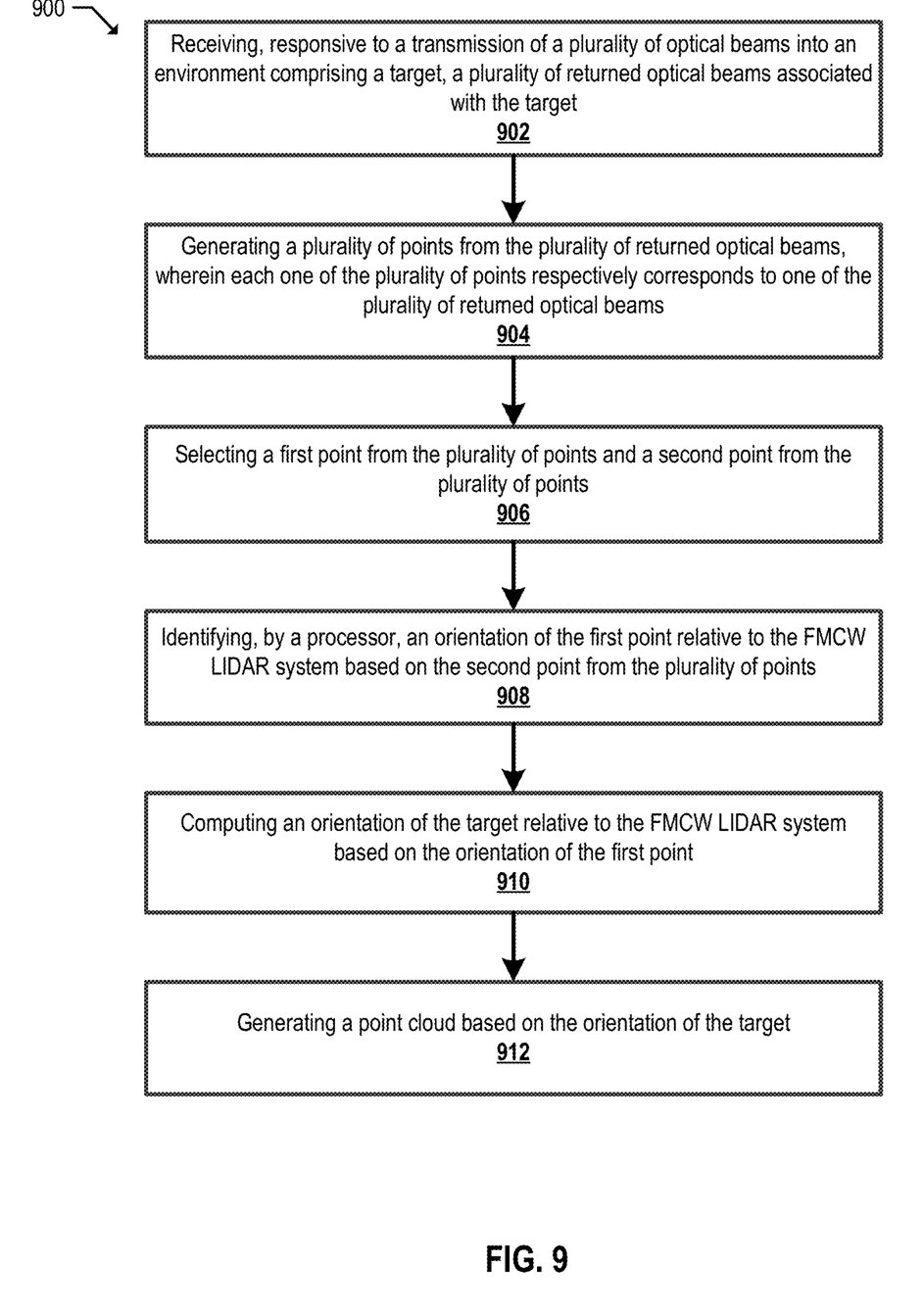
FIG. 9 is a flow diagram illustrating an example method for determining target orientation, according to some embodiments.

FIG. 9 is a flow diagram illustrating an example method for determining target orientation. Additional, fewer, or different operations may be performed in the method depending on the particular arrangement. In some embodiments, some or all operations of method 900 may be performed by one or more processors executing on one or more computing devices, systems, or servers (e.g., remote/networked servers or local servers). In some embodiments, method 900 may be performed by a signal processing unit, such as signal processing unit 112 when executing target orientation module 113 in FIG. 1. Each operation may be re-ordered, added, removed, or repeated.

In some embodiments, the method 900 may include the operation 902 of receiving, responsive to a transmission of a plurality of optical beams into an environment including a target, a plurality of returned optical beams associated with the target. In some embodiments, the method 900 may include the operation 904 of generating a plurality of points from the plurality of returned optical beams, wherein each one of the plurality of points respectively corresponds to one of the plurality of returned optical beams. In some embodiments, the method 900 may include the operation 906 of selecting a first point from the plurality of points and a second point from the plurality of points. In some embodiments, the method 900 may include the operation 908 of determining, by a processor, an orientation of the first point relative to the FMCW LIDAR system based on the second point from the plurality of points. In some embodiments, the method 900 may include the operation 910 of computing an orientation of the target relative to the FMCW LIDAR system based on the orientation of the first point. In some embodiments, the method 900 may include the operation 912 of generating a point cloud based on the orientation of the target.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. While this specification contains many specific implementation details, these should not be construed as limitations on the scope of any embodiment of the present disclosure or of what may be claimed, but rather as descriptions of features specific to particular embodiments of the present disclosure. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination. Moreover, the separation of various system components in the embodiments described above should not be understood as requiring such separation in all embodiments, and it should be understood that the described program components and systems can generally be integrated together in a single software product or packaged into multiple software products. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be in an intermittent or alternating manner.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method of computing an orientation of a target in a frequency-modulated continuous wave (FMCW) light detection and ranging (LIDAR) system, the method comprising:
   receiving, responsive to a transmission of a plurality of optical beams into an environment comprising a target, a plurality of returned optical beams associated with the target;
   generating a plurality of points from the plurality of returned optical beams, wherein each one of the plurality of points respectively corresponds to one of the plurality of returned optical beams;
   selecting a first point from the plurality of points;
   identifying, by a processor, an orientation of the first point relative to the FMCW LIDAR system, wherein the identifying of the orientation of the first point further comprises:
      computing a plurality of beat frequencies associated with the plurality of returned optical beams based on a plurality of times at which each one of the plurality of returned optical beams is received;
      transforming the plurality of beat frequencies into a frequency spectrum plot in frequency space;
      calculating a plurality of peak widths of the frequency spectrum plot, wherein each one of the plurality of peak widths is associated with one of the plurality of points;
      identifying a Fast Fourier Transform (FFT) integration time associated with the plurality of returned optical beams;
      identifying a scanner speed associated with the plurality of returned optical beams;
      transforming the plurality of peak widths into a plurality of normalized peak widths based on the FFT integration time and the scanner speed;
      aggregating the plurality of normalized peak widths into a normalized peak width distribution; and
      translating the normalized peak width distribution to the orientation of the first point;
   computing an orientation of the target relative to the FMCW LIDAR system based on the orientation of the first point; and
   generating a point cloud based on the orientation of the target.

2. The method of claim 1, wherein the identifying of the orientation of the first point further comprises:
   identifying a first returned optical beam from the plurality of returned optical beams that corresponds to the first point;
   computing a first beat frequency, in the plurality of beat frequencies, of the first returned optical beam based on a time at which the first returned optical beam is received;
   identifying a second returned optical beam of the plurality of returned optical beams that corresponds to a second one of the plurality of points;

computing a second beat frequency, in the plurality of beat frequencies, of the second returned optical beam based on a time at which the second returned optical beam is received;

computing a velocity error based on a difference between the first beat frequency and the second beat frequency; and transforming the velocity error to the orientation of the first point based on a predefined translation function.

3. The method of claim 1, wherein each optical beam in the plurality of optical beams is a FMCW optical beam, the method further comprising:

identifying a first one of the plurality of points associated with a first one of a plurality of lasers that transmits a first optical beam from the plurality of optical beams, wherein the first optical beam is associated with a first returned optical beam from the plurality of returned optical beams;

computing a first beat frequency, in the plurality of beat frequencies, of the first returned optical beam based on a time at which the first returned optical beam is received;

identifying a second one of the plurality of points associated with a second one of the plurality of lasers that transmits a second optical beam from the plurality of optical beams, wherein the second optical beam is associated with a second returned optical beam from the plurality of returned optical beams;

computing a second beat frequency, in the plurality of beat frequencies, of the second returned optical beam based on a time at which the second returned optical beam is received;

determining a frequency difference between the first beat frequency and the second beat frequency; and translating the frequency difference to the orientation of the first point based on a predefined translation function.

4. The method of claim 1, wherein the target is a moving target, the method further comprising:

determining a shape of the moving target based on the orientation of the moving target; and generating the point cloud based on the shape of the moving target.

5. A frequency-modulated continuous wave (FMCW) light detection and ranging (LIDAR) system, the system comprising:

an optical source to transmit a plurality of optical beams towards a target;

an optical receiver to receive a plurality of returned optical beams associated with the target;

a processor; and a memory to store instructions that, when executed by the processor, cause the system to:

generate a plurality of points from the plurality of returned optical beams, wherein each one of the plurality of points respectively corresponds to one of the plurality of returned optical beams;

select a first point from the plurality;

identify an orientation of the first point relative to the FMCW LIDAR system, further comprising:

compute a plurality of beat frequencies associated with the plurality of returned optical beams based on a plurality of times at which each one of the plurality of returned optical beams is received;

transform the plurality of beat frequencies into a frequency spectrum plot in frequency space;

calculate a plurality of peak widths of the frequency spectrum plot, wherein each one of the plurality of peak widths is associated with one of the plurality of points;

identify a Fast Fourier Transform (FFT) integration time associated with the plurality of returned optical beams;

identify a scanner speed associated with the plurality of returned optical beams;

transform the plurality of peak widths into a plurality of normalized peak widths based on the FFT integration time and the scanner speed;

aggregate the plurality of normalized peak widths into a normalized peak width distribution; and translate the normalized peak width distribution to the orientation of the first point;

compute an orientation of the target relative to the FMCW LIDAR system based on the orientation of the first point; and generate a point cloud based on the orientation of the target.

6. The FMCW LIDAR system of claim 5, wherein the instructions, when executed by the processor, cause the system to:

identify a first returned optical beam from the plurality of returned optical beams that corresponds to the first point;

compute a first beat frequency, in the plurality of beat frequencies, of the first returned optical beam based on a time at which the first returned optical beam is received;

identify a second returned optical beam of the plurality of returned optical beams that corresponds to a second one of the plurality of points;

compute a second beat frequency, in the plurality of beat frequencies, of the second returned optical beam based on a time at which the second returned optical beam is received;

compute a velocity error based on a difference between the first beat frequency and the second beat frequency; and transform the velocity error to the orientation of the first point based on a predefined translation function.

7. The FMCW LIDAR system of claim 5, wherein the instructions, when executed by the processor, cause the system to:

identify a first one of the plurality of points associated with a first one of a plurality of lasers that transmits a first optical beam from the plurality of optical beams, wherein the first optical beam is associated with a first returned optical beam from the plurality of returned optical beams;

compute a first beat frequency, in the plurality of beat frequencies, of the first returned optical beam based on a time at which the first returned optical beam is received;

identify a second one of the plurality of points associated with a second one of the plurality of lasers that transmits a second optical beam from the plurality of optical beams, wherein the second optical beam is associated with a second returned optical beam from the plurality of returned optical beams;

compute a second beat frequency, in the plurality of beat frequencies, of the second returned optical beam based on a time at which the second returned optical beam is received;

determine a frequency difference between the first beat frequency and the second beat frequency; and translate the frequency difference to the orientation of the first point based on a predefined translation function.

8. The FMCW LIDAR system of claim 5, wherein the target is a moving target, and wherein the instructions, when executed by the processor, cause the system to:

determine a shape of the moving target based on the orientation of the moving target; and generate the point cloud based on the shape of the moving target.

9. A frequency-modulated continuous wave (FMCW) light detection and ranging (LIDAR) system, the system comprising:

an optical source to transmit a plurality of optical beams towards a target;

an optical receiver to receive a plurality of returned optical beams associated with the target;

a circuitry; and a memory to store instructions that, when executed by the circuitry, cause the system to:

generate a plurality of points from the plurality of returned optical beams, wherein each one of the plurality of points respectively corresponds to one of the plurality of returned optical beams;

select a first point from the plurality of points;

determine, by a processor, an orientation of the first point relative to the FMCW LIDAR system, further comprising:

compute a plurality of beat frequencies associated with the plurality of returned optical beams based on a plurality of times at which each one of the plurality of returned optical beams is received;

transform the plurality of beat frequencies into a frequency spectrum plot in frequency space;

calculate a plurality of peak widths of the frequency spectrum plot, wherein each one of the plurality of peak widths is associated with one of the plurality of points;

identify a Fast Fourier Transform (FFT) integration time associated with the plurality of returned optical beams;

identify a scanner speed associated with the plurality of returned optical beams;

transform the plurality of peak widths into a plurality of normalized peak widths based on the FFT integration time and the scanner speed;

aggregate the plurality of normalized peak widths into a normalized peak width distribution; and translate the normalized peak width distribution to the orientation of the first point;

compute an orientation of the target relative to the FMCW LIDAR system based on the orientation of the first point; and generate a point cloud based on the orientation of the target.

10. The FMCW LIDAR system of claim 9, wherein the instructions, when executed by the circuitry, cause the system to:

identify a first returned optical beam from the plurality of returned optical beams that corresponds to the first point;

compute a first beat frequency, in the plurality of beat frequencies, of the first returned optical beam based on a time at which the first returned optical beam is received;

identify a second returned optical beam of the plurality of returned optical beams that corresponds to a second one of the plurality of points;

compute a second beat frequency, in the plurality of beat frequencies, of the second returned optical beam based on a time at which the second returned optical beam is received;

compute a velocity error based on a difference between the first beat frequency and the second beat frequency; and transform the velocity error to the orientation of the first point based on a predefined translation function.

11. The FMCW LIDAR system of claim 9, wherein the instructions, when executed by the circuitry, cause the system to:

identify a first one of the plurality of points associated with a first one of a plurality of lasers that transmits a first optical beam from the plurality of optical beams, wherein the first optical beam is associated with a first returned optical beam from the plurality of returned optical beams;

compute a first beat frequency, in the plurality of beat frequencies, of the first returned optical beam based on a time at which the first returned optical beam is received;

identify a second one of the plurality of points associated with a second one of the plurality of lasers that transmits a second optical beam from the plurality of optical beams, wherein the second optical beam is associated with a second returned optical beam from the plurality of returned optical beams;

compute a second beat frequency, in the plurality of beat frequencies, of the second returned optical beam based on a time at which the second returned optical beam is received;

determine a frequency difference between the first beat frequency and the second beat frequency; and translate the frequency difference to the orientation of the first point based on a predefined translation function.

* * * * *